United States Patent [19]
Yonekubo et al.

[11] Patent Number: 4,750,152
[45] Date of Patent: Jun. 7, 1988

[54] OPTICAL READ/WRITE DEVICE

[75] Inventors: Masatoshi Yonekubo; Shigeru Kogure, both of Suwa, Japan

[73] Assignee: Seiko Epson Corporation, Tokyo, Japan

[21] Appl. No.: 925,202

[22] Filed: Oct. 31, 1986

[30] Foreign Application Priority Data

Nov. 8, 1985 [JP] Japan ................................. 60-250128

[51] Int. Cl.$^4$ ............................................. G11B 21/10
[52] U.S. Cl. ........................................ 369/46; 369/45; 369/13; 250/201; 360/59
[58] Field of Search ................... 369/45, 46, 109, 111, 369/13; 250/201 DF; 360/59

[56] References Cited

U.S. PATENT DOCUMENTS

| | | | |
|---|---|---|---|
| 3,876,841 | 4/1975 | Kramer et al. | 369/46 X |
| 4,020,278 | 4/1977 | Carré et al. | 369/109 X |
| 4,025,784 | 5/1977 | LeLureau et al. | 369/46 X |

OTHER PUBLICATIONS

"Magneto-Optics Packs a 5-cm Disk with 10 Megabytes", John Gosch, Electronics, Dec. 29, 1982, pp. 45,46.

"Digital Magneto-Optical Recorder" by I. Sander, M. Urner-Willie, pp. 240-244.

Miscellaneous Publications of Verbatim Corporation dated 6/85, including "Proposed 1987 Specifications", 1 p. and "On Track", vol. 1, No. 1, Issue No. 2, Jul., 1985, pp. 1-4.

"NCC Erasable" from Optical Memory News, Jul.-Aug., 1985, pp. 4,6,7.

"Optical 3-½-Inch Drive Adds Erasability", Carl Warren, Mini-Micro Systems, Jul. 1985, pp. 133,134,137,138,141.

Primary Examiner—Aristotelis M. Psitos
Attorney, Agent, or Firm—Blum, Kaplan, Friedman, Silberman & Beran

[57] ABSTRACT

An apparatus for reading data to and from a moving magneto-optical recording medium includes a carriage which is moved across data tracks contained in the medium. Optics for focusing a spot of light on the medium and a mechanism for fine tracking of the spot on a selected track are carried on the carriage and are movable independently of the carriage in response to separately amplified servo signals which are derived from light which is reflected from the spot of light on the data-containing track.

20 Claims, 2 Drawing Sheets

FIG.2
PRIOR ART
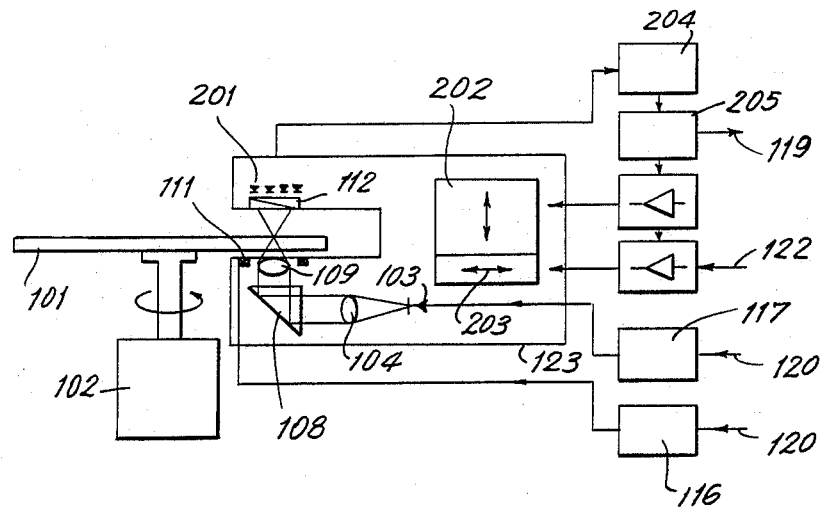
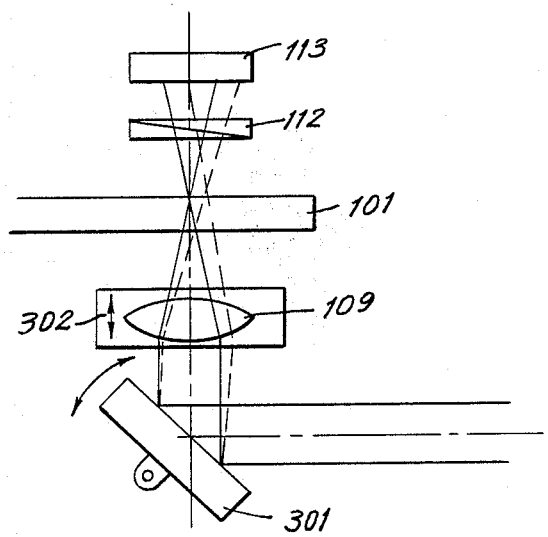
FIG.3

OPTICAL READ/WRITE DEVICE

BACKGROUND OF THE INVENTION

The present invention relates to a device for writing and reading data to and from an optical recording medium. More particularly, the invention relates to a device for use in writing and reading data by means of a beam of radiant energy to and from a moving magneto-optic recording medium.

Known devices which are used for writing and reading data to and from an optical recording medium, hereinafter known as read/write devices, make use of two physical principles. In one such device, the reflection type, the Kerr effect is used; in a second type, the transmission type, the Faraday effect is used.

In devices using the Kerr effect, light is reflected from the optical recording medium in a complicated optical system in which linearly polarized light is transformed into elliptically polarized light. In such devices special optical elements having little phase difference between the P and the S components of the polarized light are required in order to avoid defective data translation and the source of the optical light beam must have a large power output in order to produce even a small output of light through the objective lens.

Optical read/write devices of the transmission type, e.g. those which use the Faraday effect, have been provided with a view to solving the above problems. A schematic diagram of such a device is shown in FIG. 2. As depicted in FIG. 2, data is input to a magnetic controller 116 and to a laser driver 117 at the input terminals marked 120. Magnetic controller 116 provides a signal for energizing magnetic coil 111 to magnetize an optical recording medium 101 in the desired writing direction. Optical recording medium 101 is a disk which is rotated by means of a drive motor 102 so that the recording occurs along a track in the optical recording medium. The radiation produced by a laser diode 103 is collimated in a collimator lens 104 into a beam which is directed by a total reflection prism 108 to an objective lens 109, where it is focused upon optical recording medium 101. The energy in the focused beam spot causes the temperature of optical recording medium 101 to rise near to the Curie point, enabling the magnetization of optical recording medium 101 to be reversed by a magnetic field produced by coil 111 to effect data storage.

To read the stored data, a linearly polarized beam from laser diode 103 is caused to pass through optical recording medium 101 and the plane of polarization of the beam is rotated thereby in dependence on the direction of magnetization of the medium. Subsequently, the beam passes through an analyzer 112 and falls onto a 4-element stripe-type photodiode 201. In photodiode 201, the received light signal is transformed into an electrical signal which is first amplified by a head amplifier 204 and is then divided in a signal-dividing circuit 205 into a data signal which is output from terminal 119 and into servo signals which are fed to a focusing actuator 202 and a tracking actuator 203.

To find the track which contains data desired for reading out, a track access signal is fed in via terminal 122 to drive tracking actuator 203. A support frame 123 which supports laser diode 103, collimator lens 104, reflecting prism 108, objective lens 109, polarizer 112, and sensor 201, is driven by focusing actuator 202 in the optical axial direction (normal to the optical recording medium) and by tracking actuator 203 in a direction transverse to the optical axial direction, and at right angles to the data track (parallel to the plane of the optical recording medium).

The above-described, known, Faraday principle, optical read/write device has the following problems.

First, support frame 123 is very heavy and, when driven in controlled motion in the axial and transverse directions by appropriate focusing and tracking servo signals, has high inertia and long access times.

Second, high tracking accuracy is difficult to obtain because frame 123 is driven in coarse adjustment by tracking actuator 203 in response to the track access signal, and at the same time is moved in fine adjustment by means of the servo signal. To obtain high tracking accuracy in a short period of time, a large magnetic circuit and large driving currents must be used. Otherwise the optical the recording medium must be rotated at a low speed, with a resulting reduction in transfer rate.

Third, head amplifier 204 is used for amplification of both the data signal and servo signal. However, since the data signal is in the MHz range and the servo signal is in KHz range, it is difficult to design a head amplifier which is suitable without significant deterioration of the S/N ratio.

SUMMARY OF THE INVENTION

The present invention solves the above problems by providing an optical read/write device of the Faraday type in which the tracking servo signal and the focusing servo signal are obtained from a second detector which receives light which is reflected from the optical recording medium, amd which is separately amplified. Thus, the data signals, which are produced by a first detector from transmitted light, and the control signals, which are produced by a second detector from reflected light, are separately processed in separate amplifiers which pass the frequency bands of the respective signals, yielding greatly improved S/N ratios for each circuit and a greatly improved S/N ratio and improved access rates for the system as a whole.

Further, with the apparatus of the invention, it is not necessary to move the whole frame by small increments in two directions, since provision is made for course tracking movement of the frame, while fine tracking and focusing movements are accomplished by special apparatus carried on the frame and separately controlled. Therefore, high accuracy of access is realized in a short timer period, while utilizing lower power. Since corrections are quickly made along both the optical axis and at right angles to the track, the optical recording medium can be rotated at high speed to obtain an improved data transfer rate.

The read/write optical device of the invention includes a source of radiant energy such as a laser, a condensing means for optically condensing a beam from the laser onto an optical recording medium, a first detector for detecting data stored in the optical recording energy, the optical means, and the first detector. A first driver provides major movement of the frame essentially parallel to the plane of the optical recording medium and an actuator carried on the frame provides additional movement of the beam spot to the precise desired track location on the optical recording medium. A second driver carried by the frame is provided for moving the optics along the optical axis for focusing. A second detector is provided which detects light that is reflected from the optical recording medium and generates servo signals which are fed to the second driver and to the actuator for focusing and positioning the spot at the desired point on a recording track.

In the apparatus of the invention, light which is reflected from the recording medium is directed by the optical system to the second detecting means and is utilized for reporting focusing and tracking errors. The resulting electric signal is amplified in a low noise head amplifier which passes frequencies in the signal band of the servo which drives the lens actuator. Thus, high quality error signals are supplied to the actuator. In one embodiment, the actuator drives a simple structure in which only the lens is moved. In another embodiment, the actuator only focuses the lens, while the tracking function is accomplished by a tracking mechanism, such as a galvanic mirror which changes the angle of incidence of the beam on the objective lens. The data signal is obtained from light which is transmitted through the recording medium to the first detector, providing a substantial electrical signal which is then amplified by a head amplifier which passes frequencies in the appropriate data signal band, thus providing a high S/N ratio in the data circuit.

It is an object, therefore, of the present invention, to provide a new and improved optical read/write apparatus for use with an optical recording medium which provides highly accurate access to data tracks in the medium while consuming low power.

Another object of the invention is to provide an optical read/write device in which position and movement of the optics is controlled separately from the supporting frame as to both optical access and track position so as to realize highly accurate, rapid access to a selected data track with use of low power.

Still another object of the invention is the provision of an optical read/write device for use with magneto-optic recording media which can be rotated at high speed, providing a high rate of data transfer.

A still further object of the invention is the provision of an optical read/write device in which separate channels are provided for the servo signals which control motion along the axis of the optics and at right angles to the track, thereby improving the S/N ratio of the system.

Still another object of the invention is to provide an optical read/write device which is capable of efficiently and accurately reproducing data that is stored in commonly available optical recording media utilizing variations in the amount of reflected light, such media including the DRAW optical recording disk, the compact audio disk, and the CD-ROM.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a block diagram of a known optical read/write device; and

FIG. 3 is a schematic representation of a second embodiment of a tracking mechanism in accordance with the teachings of the invention.

DETAILED DESCRIPTION OF THE INVENTION

Figure 1:
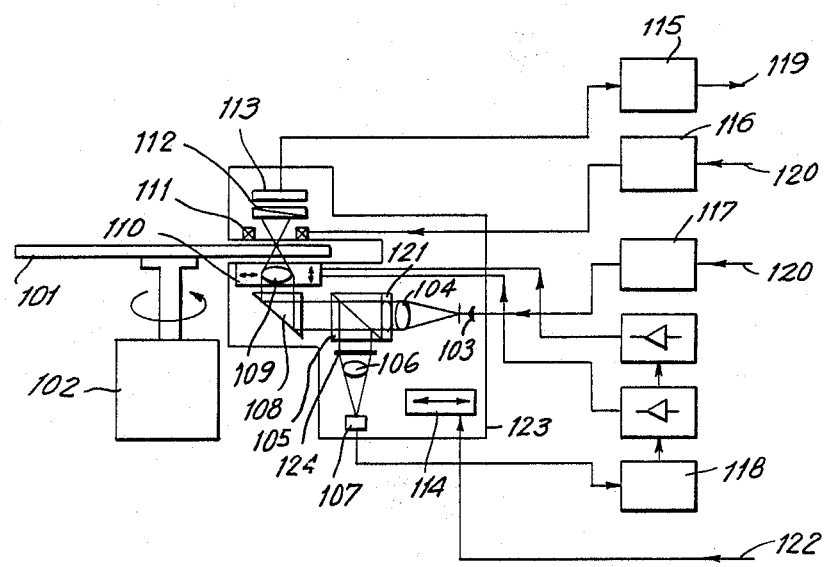
FIG. 1 is a block diagram of an optical read/write device in accordance with the teachings of the present invention.

Reference is first made to FIG. 1, where a schematic representation of an optical read/write device which is coupled to a block diagram of the necessary electronic components, is depicted. A data signal, input to data input terminals 120, is fed into a magnet controller 116 and a laser driver 117. A magnet controller 116 energizes a coil 111 which is supported next to a rotating optical data storage disk 101, to magnetize the recording medium of the disk. Laser driver 117 energizes a laser diode 103 which directs a laser beam through the optics of the apparatus onto the magnetized storage medium. The optical storage medium may comprise a magnetic thin film such as GdTbFe, TbFeCo, DyFeCo, or the like. The combined effects of the magnetization and the heat produced by the laser beam result in reversal of the magnetic moment of the media and the storage of data, in a manner known in the art.

To read the stored data, a laser beam of 780 nm is emitted by laser diode 103, collimated by a collimator lens 104, and passed into a beam shaping plane 121, where the cross section of the beam is transformed into circular shape. The light is then transformed into a completely linearly polarized form by a polarizing beam splitter 105 which provides 100% reflectance of the S component of polarized light and 50% transmittance of the P component of polarized light. The linearly polarized light passes from beam splitter 105 into a totally reflecting prism 108, where it is deflected at right angles and fed to an objective lens 109. An objective lens 109 is provided in the optics for focusing the light onto optical recording medium 101, and provides a beam having a focused diameter of 1.6 μm thereon. Light passing through optical recording medium 101 is detected by an analyzer 112 whence it passes into a PIN photodiode 113 which has a 4 mm diameter. PIN photodiode 113 transforms the light into an electrical signal which is amplified by a head amplifier 115. Head amplifier 115 is designed specially for the processing of the data signal which is output by photodiode 113 and provides a working data output signal at terminal 119.

At the same time, a constant amount of light from the beam, reflected by optical recording medium 101, is collimated into a beam by passing in the reverse direction through objective lens 109. The beam from lens 109 is reflected via total reflection prism 108 to polarizing beam splitter 105 which reflects 50% of the beam at a knife-edge 124. The resulting semicircular beam is condensed by condensor lens 106 and transmitted to a 4-segment PIN servo photodiode 107 which has a diameter of 1 mm. As illustrated in FIG. 1, condensor lens 106 and servo photodiode 107 are disposed perpendicular to the plane of optical recording medium 101; they can, of course, be disposed parallel thereto.

The electrical signal produced by PIN servo photodiode 107 is amplified in a head amplifier 118 which has a pass band specifically designed for the frequencies of the servo signal. The knife-edge method is used to obtain the focusing error signal and the push-pull method is used to provide the tracking error signal. The servo signals, separately amplified in amplifiers 130 and 131, are supplied as a focusing error signal and a tracking error signal to a two-axis lens actuator 110. Two-axis lens actuator 110 responds to the servo signals to focus the beam on optical recording medium 101 and to cause the beam to correctly follow a track in the medium. The tracking access signal 122 supplied to the linear motor 114 which moves frame 123 at right angles to the track in optical recording medium 101.

Optical recording medium 101 is in the form of a disk which has a diameter of from 90 mm or 130 mm and is provided with spiral or concentric grooves which have a depth of ⅛th wave length and a track pitch of 1.6 $\mu$m. Optical recording medium 101 is rotated at a constant angular velocity of 1800 RPM or at a maximum linear velocity which is the equivalent of 1800 RPM, by spindle drive motor 102. In the illustrated embodiment, an unformatted storage capacity of 200 MB, and average access time of 40 ms, and a transfer rate of 6 Mbit/s were realized at a S/N which was sufficiently high to obtain an error rate of $10^{-12}$ after error correction.

Reference is now made to FIG. 3 which is a schematic view of a second embodiment of a tracking mechanism in accordance with the present invention. In the embodiment of FIG. 3, the tracking mechanism includes a galvanic mirror 301 which is rotated back and forth in response to the tracking error signal from head amplifier 118 to change the angle of incidence of the light which is directed onto objective lens 109. To insure that the amplitude of the transmitted data signal is not reduced by the lateral displacement of the beam by the track in optical recording media 101, PIN data detector photodiode 113 is made large enough to receive all of the light which is transmitted at either extreme of beam movement. In FIG. 3, the broken lines show one path of the light beam when it is fully deflected.

In the embodiment of FIG. 3. the focusing of light passing through objective lens 109 is accomplished by a focusing actuator 302 which moves solely in the direction of the optical axis. The remainder of the optical read/write device, which is not illustrated in FIG. 3, is the same as that of the embodiment of FIG. 1. Thus, in FIG. 3, galvanic mirror 301 replaces total reflection prism 108 and provides the fine tracking function of two-axis lens actuator 101, while the gross displacement of frame 123 for tracking is accomplished, as before, by linear tracking motor 114.

In summary, the present invention utilizes the Faraday effect to provide a device for optically reading and writing on a thermo-magneto medium with the following beneficial effects.

First, the first driving means quickly moves the whole frame parallel to the optical recording medium, across the recording tracks. The second driving means, separately (from the first driving means) and with a high degree of accuracy, controls the movement of the focusing lens along the optical axis, while the actuator means controls the precise tracking of the spot at right angles to the selected track. Since it is no longer necessary to focus the beam and to make fine adjustments by moving the whole frame in the two directions, highly accurate, rapid access to the data track, and therefore to the data, is provided while using low power.

Second, the focusing means of the invention can respond to error signals quickly, allowing high rotation speeds of the recording medium, while providing an improved data transfer rate.

Third, with the separate detecting means and signal channels of the invention, separate head amplifiers are provided for the data signals and for the servo error signals. The pass band of each head amplifier is adjusted to provide the maximum S/N ratio for the respective channel. An improved, e.g. reduced, error rate is the result.

Fourth, the optical read/write device of the present invention is capable of reproducing data stored in commonly available optical recording media other than the thermo-magneto media of the illustrated embodiments. For example, the invention can be utilized with commonly available optical recording media in which the amount of reflected light is a variable, such as the DRAW optical recording disk, the compact disk, and the CD-ROM. Such compatibility is desirable in order to minimize the number of optical read/write devices which must be employed to accommodate different media.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An optical read/write device comprising:
   a source of radiant energy;
   an optical recording medium having a plane in which data is stored in at least one data track;
   optical means for condensing a beam from the source along an optical axis to produce a spot on the plane;
   first detecting means for detecting light transmitted by the optical recording medium to read out data which is stored therein;
   frame means for supporting the source, the optical means, and the first detecting means;
   first driving means coupled to the frame means for moving the frame means parallel to the plane of the optical recording medium and across the data track;
   second driving means carried on the frame means and coupled to the optical means for moving the optical means along the optical axis in response to a focusing control signal;
   actuator means carried on the frame means for moving the spot to a desired location on the optical recording medium in response to a tracking control signal; and
   second detecting means carried on the frame means for detecting light reflected from the optical recording medium, the second detecting means providing error signals for controlling operation of the second driving means and of the actuator means.

2. The optical read/write device of claim 1 in which the first detecting means comprises an analyzer for detecting the angle of polarization of the beam after it is passed through the optical recording medium.

3. The optical read/write device of claim 2, and further comprising:
   magnetizing means supported adjacent to the optical recording medium for magnetizing the optical recording medium.

4. The optical read/write device of claim 1, wherein the optical means comprises an objective lens.

5. The optical read/write device of claim 4, wherein the objective lens is moved toward and away from the data track by the second driving means to focus the spot.

6. The optical read/write device of claim 4, wherein the actuator means moves the objective lens essentially laterally relative to the data track to move the spot.

7. The optical read/write device of claim 4, wherein the second drive means and the actuator means comprise a two-axis objective lens actuator.

8. The optical read/write device of claim 4, wherein the actuator means changes the angle of incidence of the beam on the objective lens to move the spot.

9. The optical read/write device of claim 8, wherein the actuator means comprises a galvanically actuated mirror.

10. The optical read/write device of claim 1, wherein the optical means further comprises:
    beam shaping means for shaping the beam from the source into a circle which is directed along the optical axis.

11. The optical read/write device of claim 10, and further comprising:
    polarizing beam splitter means providing reflectance of the S component of the polarized light and transmittance of at least a portion of the P component of the polarized light.

12. The optical read/write device of claim 11, wherein the polarizing beam splitter means provides substantially 100% reflectance of the S component and approximately 50% transmittance of the P component.

13. The optical read/write device of claim 11, and further comprising:
    lens made for focusing light transmitted by the polarizing beam splitter means into the spot on the optical recording medium.

14. The optical read/write device of claim 11, wherein the first detecting means further comprises:
    analyzer means for transmitting light which is received from the spot on the optical recording medium to the first detecting means.

15. The optical read/write device of claim 1, and further comprising:
    amplifier means for amplifying the electric signal output of the first detecting means, the amplifier means having a frequency band for maximizing the S/N ratio of the data signal.

16. The optical read/write device of claim 11, wherein a constant amount of the light which is reflected from the spot on the optical recording medium is returned to the polarizing beam splitter means, and further comprising:
    beam shaping means receiving at least a portion of the light reflected from the polarizing beam splitter means, the shaped beam from the beam shaping means being directed to the second detector means.

17. The optical read/write device of claim 16, wherein the second driving means and the actuator means comprise a two-axis lens actuator.

18. The optical read/write device of claim 16 and further comprising:
    knife-edge means between the polarizing beam splitter means and the second detector means for shaping the beam into a half circle.

19. The optical read/write device of claim 18 and wherein the second detector means provides at least one output signal, and further comprising:
    means for amplifying the output signal to provide at least one of a focusing error signal based on the knife-edge method and a tracking error signal based on the push-pull method.

20. The optical read/write system of claim 15, and further comprising:
    amplifier means separate from the first-named amplifier means for amplifying the output of the second detector means, the separate amplifying means having a frequency band for maximizing the S/N ratio of at least one of the focusing control signal and the tracking control signal.

* * * * *